US012689591B2

(12) United States Patent
    Cha et al.

(10) Patent No.:  US 12,689,591 B2
(45) Date of Patent:       Jul. 21, 2026

(54) WIRELESS-CORE CONVERGED USER PLANE DEVICE IN COMMUNICATION SYSTEM, AND OPERATING METHOD

(71) Applicant: Samsung Electronics Co., Ltd., Suwon-si (KR)

(72) Inventors: Jiyoung Cha, Suwon-si (KR); Dongmyung Kim, Suwon-si (KR); Younggyoun Moon, Suwon-si (KR); Jungsoo Jung, Suwon-si (KR); Sunwoo Cho, Suwon-si (KR); Jinho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 18/579,787

(22) PCT Filed: Aug. 2, 2022

(86) PCT No.: PCT/KR2022/011389
§ 371 (c)(1),
(2) Date: Jan. 16, 2024

(87) PCT Pub. No.: WO2023/014043
PCT Pub. Date: Feb. 9, 2023

(65) Prior Publication Data
US 2024/0323128 A1     Sep. 26, 2024

(30) Foreign Application Priority Data
Aug. 2, 2021     (KR) ........................ 10-2021-0101584

(51) Int. Cl.
*G06F 15/173*      (2006.01)
*H04L 47/2425*     (2022.01)
*H04W 28/02*       (2009.01)

(52) U.S. Cl.
CPC ..... *H04L 47/2425* (2013.01); *H04W 28/0268* (2013.01)

(58) Field of Classification Search
CPC .. H04L 47/80; H04L 47/2425; H04L 47/2483
See application file for complete search history.

(56) References Cited

U.S. PATENT DOCUMENTS 7,190,898 B2     3/2007  Kim et al.
9,532,238 B2    12/2016  Lv et al.
(Continued)

FOREIGN PATENT DOCUMENTS

KR     10-2003-0060160 A     7/2003
KR     10-2014-0023435 A     2/2014
(Continued)

OTHER PUBLICATIONS

Open Network Foundation, Converged Multi-Access and Core (COMAC), ONF TS-102, Version 1.0, Mar. 2020.
(Continued)

*Primary Examiner* — Yves Dalencourt
(74) *Attorney, Agent, or Firm* — Jefferson IP Law, LLP

(57)     ABSTRACT

The present disclosure relates to a 5th generation (5G) or 6th generation (6G) communication system for supporting a data transmission rate higher than that of a long term evolution (LTE) communication system. The present disclosure relates to a method performed by means of a network node in a communication system, and the method may comprise the steps of: acquiring information about a packet-processing rule from a control plane network function; receiving an Internet protocol (IP) packet through a data network, the IP packet including external quality of service (QOS) information between a source node for the IP packet and the network node; generating, on the basis of the packet-processing rule and the external QoS information, (Continued)

QoS requirements for an IP flow including the IP packet; and allocating resources for the IP flow on the basis of the QoS requirements.

15 Claims, 16 Drawing Sheets

(56) References Cited

U.S. PATENT DOCUMENTS

| | | | | |
|---|---|---|---|---|
| 10,616,120 | B2 | 4/2020 | Starsinic et al. | |
| 11,528,756 | B2 | 12/2022 | Jeong et al. | |
| 11,540,167 | B2 | 12/2022 | Sayenko et al. | |
| 2016/0218912 | A1 | 7/2016 | Vincze et al. | |
| 2017/0195239 | A1* | 7/2017 | Starsinic | H04W 4/70 |
| 2018/0368167 | A1* | 12/2018 | Kim | H04W 28/0278 |
| 2019/0327635 | A1* | 10/2019 | Wei | H04W 28/0263 |

FOREIGN PATENT DOCUMENTS

| | | | |
|---|---|---|---|
| KR | 10-2016-0035013 | A | 3/2016 |
| KR | 10-2017-0110105 | A | 10/2017 |
| KR | 10-2018-0006844 | A | 1/2018 |
| KR | 10-2019-0017399 | A | 2/2019 |
| KR | 10-2021-0019931 | A | 2/2021 |
| KR | 10-2021-0024906 | A | 3/2021 |
| KR | 10-2021-0055628 | A | 5/2021 |
| WO | 2018/071209 | A2 | 4/2018 |

OTHER PUBLICATIONS

Open Network Foundation, COMAC—Converged Multi Access & Core, 2020.
Cha et al., RAN-Core Convergence for 6G Cellular Networks, Samsung Research, Samsung Best Paper Award, 2021.
International Search Report and written opinion dated Oct. 31, 2022, issued in International Application No. PCT/KR2022/011389.
Korean Office Action dated Jun. 8, 2026, issued in Korean Application No. 10-2021-0101584.

* cited by examiner

Figure 3:
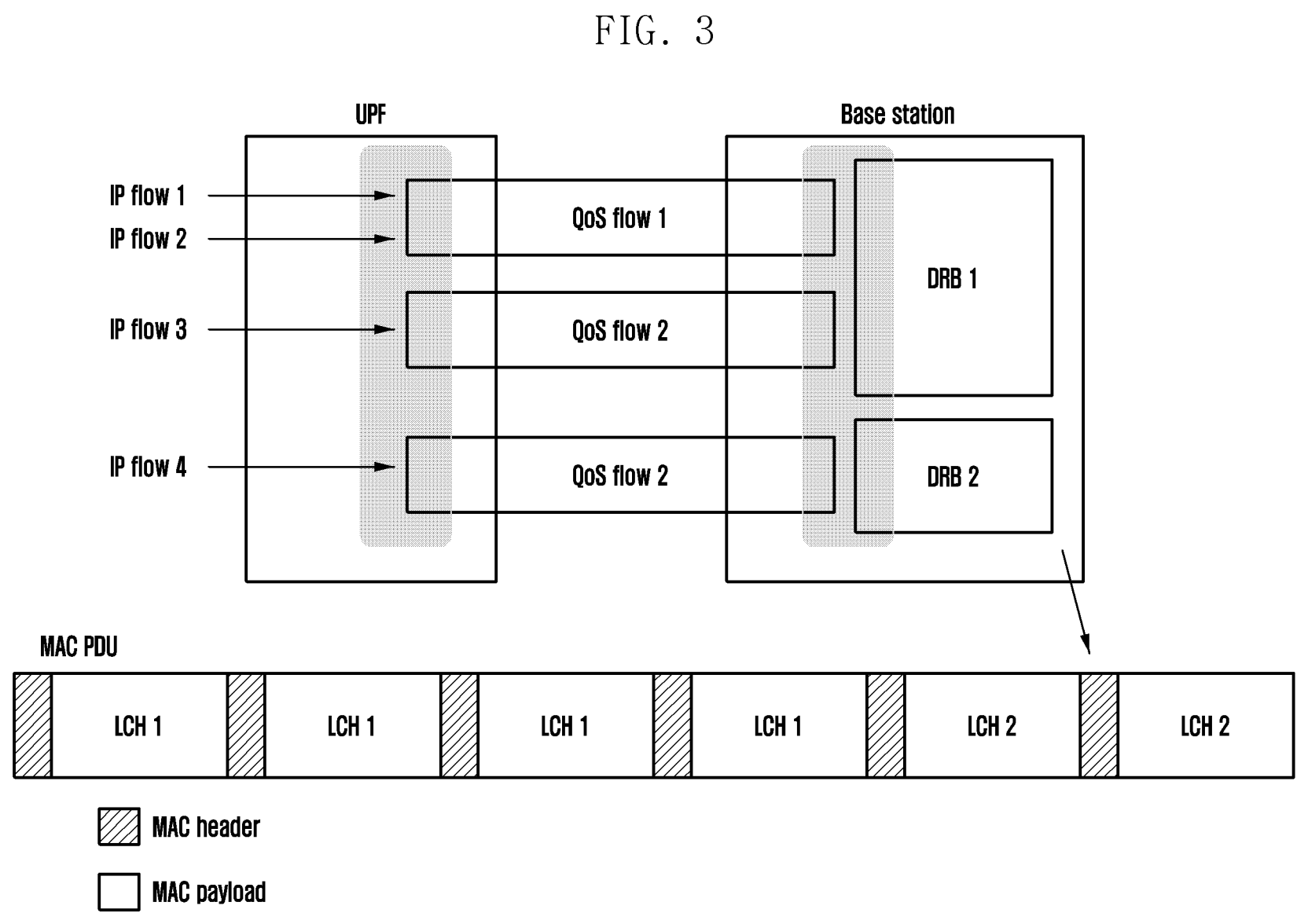

Base station

DRB 1

DRB 2

QoS flow 1

QoS flow 2

QoS flow 2

UPF

IP flow 1
IP flow 2

IP flow 3

IP flow 4

MAC PDU

LCH 1    LCH 1    LCH 1    LCH 2    LCH 2

MAC header

MAC payload

FIG. 7B

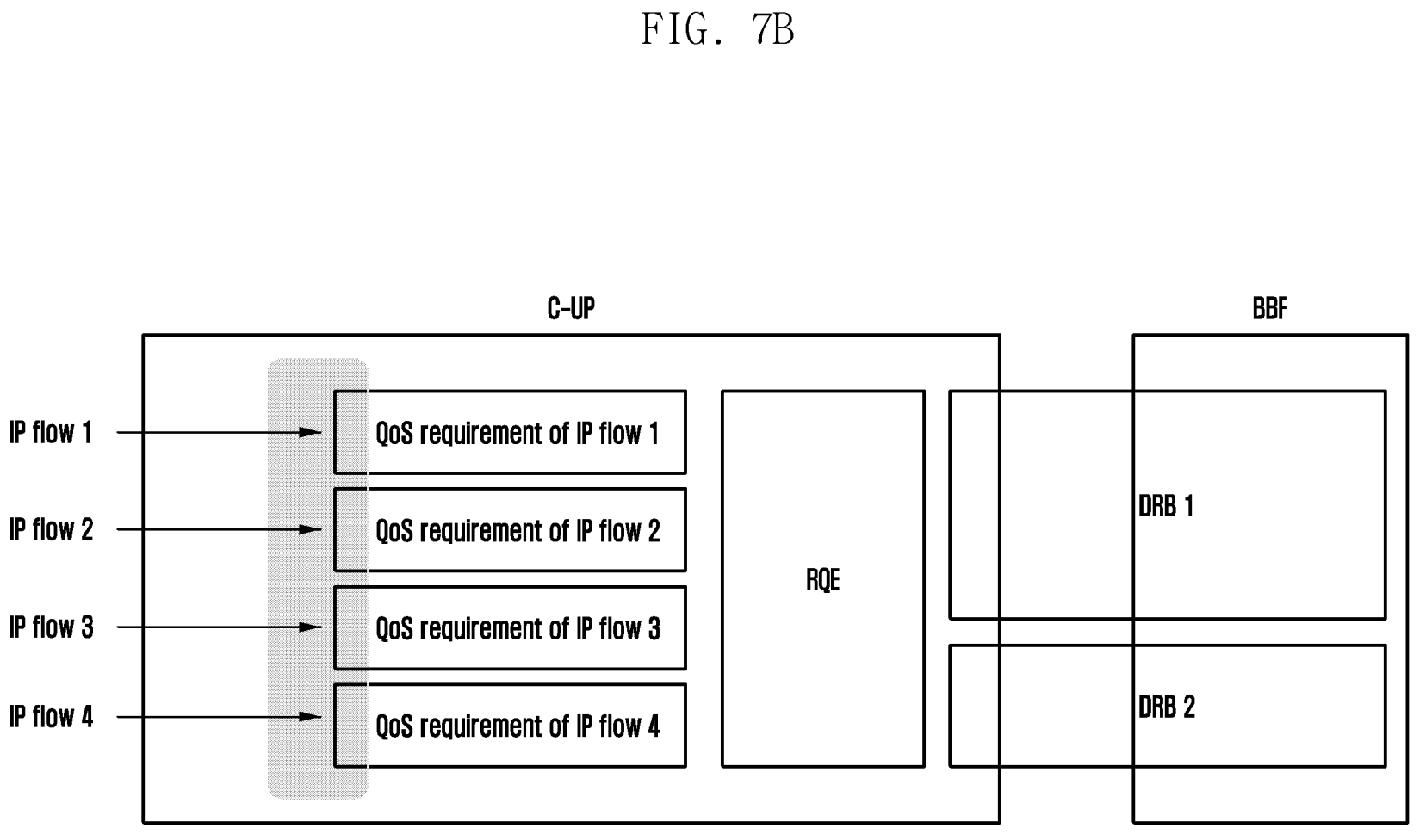

BBF

DRB 1

DRB 2

C-UP

RQE

QoS requirement of IP flow 1

QoS requirement of IP flow 2

QoS requirement of IP flow 3

QoS requirement of IP flow 4

IP flow 1

IP flow 2

IP flow 3

IP flow 4

Figure 8C:
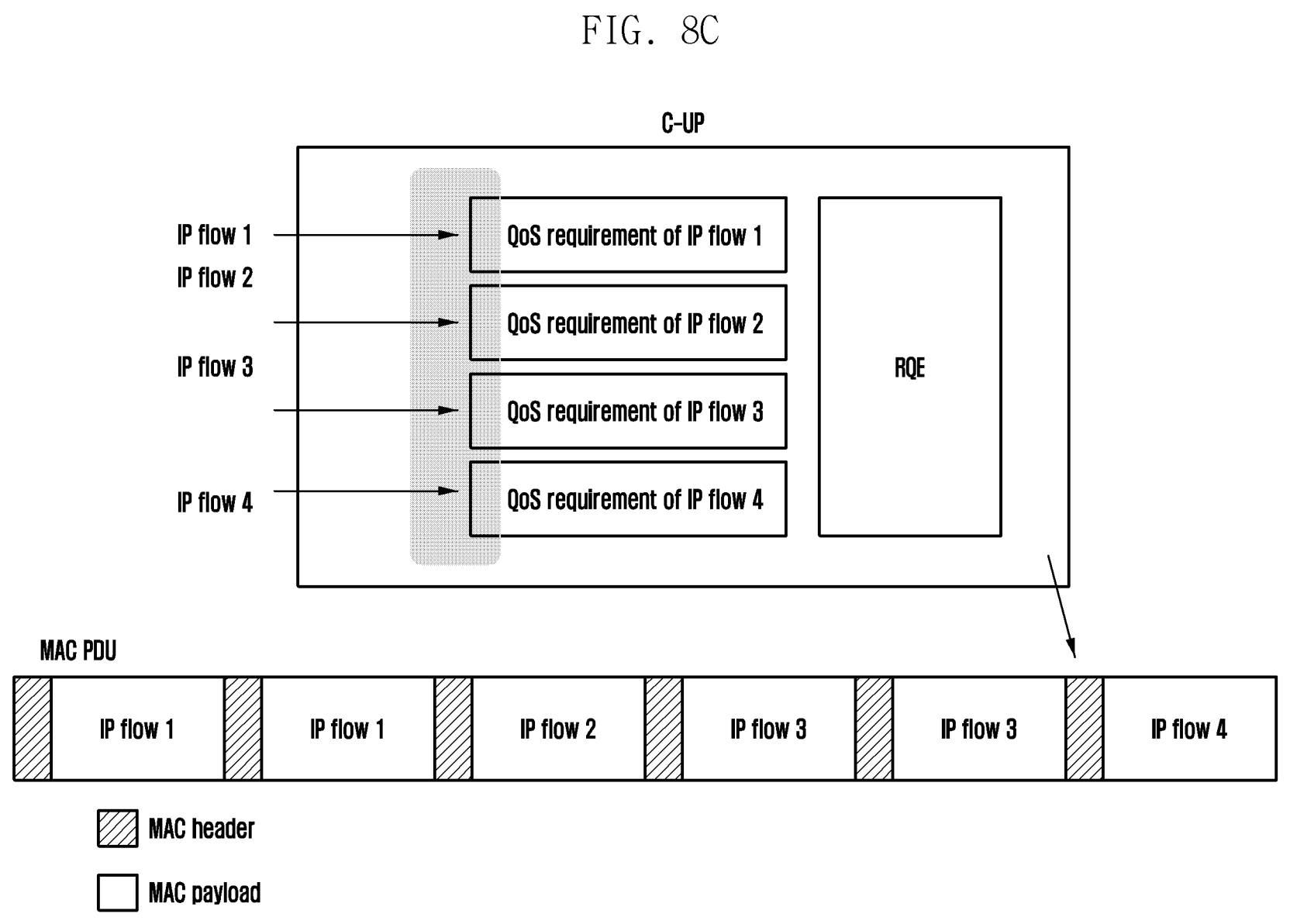

RQE

QoS requirement of IP flow 1

QoS requirement of IP flow 2

QoS requirement of IP flow 3

QoS requirement of IP flow 4

IP flow 1

IP flow 2

IP flow 3

IP flow 4

MAC PDU

IP flow 1 | IP flow 1 | IP flow 2 | IP flow 3 | IP flow 3 | IP flow 4

MAC header

MAC payload

FIG. 9A

WIRELESS-CORE CONVERGED USER PLANE DEVICE IN COMMUNICATION SYSTEM, AND OPERATING METHOD

TECHNICAL FIELD

The disclosure relates to a device and a method for processing a packet in a communication system.

BACKGROUND ART

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as "beyond-5G" systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the $\frac{1}{10}$ radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mm Wave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

A network architecture is evolving toward simplifying network functions (NFs) of a user plane (UP). For example, in 2nd generation (2G) and 3rd generation (3G), four user plane network functions are included, in 4th generation (4G), three user plane network functions are included, and in 5th generation (5G), two user plane network functions are included. In addition, in order to develop network function virtualization (NFV) technology and provide ultra-high speed/ultra-low latency services, user plane network functions (e.g., user plane function (UPF)) of a radio access network (RAN) and a core network are placed in the same physical positions. Therefore, according to the technology evolution direction of simplifying the network architecture, user plane network functions of the RAN and the core network need to be integrated.

In a conventional system, in order that each IP flow is serviced, in a user plane function (UPF), IP flow to quality-of-service (QOS) flow mapping is performed, in a service data adaptation protocol (SDAP), QOS flow to data radio bearer (DRB) mapping is performed, and QoS enforcement is performed in a unit of a QoS flow or a DRB. Furthermore, such mapping information is semi-statically transmitted from a control plane function rather than a user plane device in which actual QoS enforcement is performed.

DISCLOSURE OF INVENTION

Technical Problem

Based on the discussion described above, the disclosure provides a network node (e.g., converged-user plane (C-UP)) into which functions of a user plane are integrated, in a communication system.

In the conventional technology, QoS enforcement is performed using a semi-statically configured rule, and thus it is difficult to provide a QoS having a current QOS status that is dynamically changing. For example, if different IP flows have the same QoS characteristic, QoS enforcement, such as resource allocation, is performed in a conventional system with the goal of a QoS having the same level. However, if IP flows have different current QoS statuses outside a service provider network (e.g., a delay depending on the distance between a server and the service provider network), different QoS enforcements are required to be provided to the IP flows to improve a user's quality of experience (QoE).

The disclosure proposes a user plane device and operation which improves resource efficiency and a user's quality of experience (QoE) through deriving IP flow-specific QoS requirement at a radio node and dynamic QoS enforcement using same so as to solve the problem in the conventional technology that IP flow-specific QoS-related information is limited at a radio node largely affecting QoS.

Solution to Problem

A method performed by a network node in a communication system according to the disclosure may include obtaining information on a packet processing rule from a control plane network function, receiving an internet protocol (IP) packet via a data network, the IP packet including outside quality-of-service (QOS) information for the IP packet between a source node and the network node, generating a QoS requirement for an IP flow including the IP packet, based on the packet processing rule and the outside QoS information, and allocating a resource for the IP flow, based on the QOS requirement.

A network node in a communication system according to the disclosure may include at least one transceiver, and at least one processor operably connected to the at least one transceiver, wherein the at least one processor is configured to obtain information on a packet processing rule from a control plane network function, receive an internet protocol (IP) packet via a data network, the IP packet including outside quality-of-service (QOS) information for the IP packet between a source node and the network node, generate a QoS requirement for an IP flow, based on the packet processing rule and the outside QoS information, and allocate a resource for the IP flow, based on the QoS requirement.

Advantageous Effects of Invention

By a device and a method according to embodiments of the disclosure, functions of a user plane may be integrated in a communication system to simplify a network architecture.

In addition, by a device and a method according to embodiments of the disclosure, path delays of a user plane may be reduced.

In addition, by a device and a method according to embodiments of the disclosure, processing load caused by interfaces between user plane entities may be reduced.

In addition, by a device and a method according to embodiments of the disclosure, signaling/provisioning/updating of control information (e.g., a packet processing rule) with a control plane network function may be simplified.

In addition, by a device and a method according to embodiments of the disclosure, resource efficiency and quality of experience (QoE) may be improved through dynamic quality-of-service (QOS) enforcement.

In addition, by a device and a method according to embodiments of the disclosure, the number of user plane entities may be reduced to reduce capital expenditure (CAPEX)/operating expenditure (OPEX).

In addition, by a device and a method according to embodiments of the disclosure, overlapping work may be removed to improve the efficiency of protocol work.

BRIEF DESCRIPTION OF DRAWINGS

FIG. 2 illustrates a transmission flow of a downlink packet according to embodiments of the disclosure;

FIG. 3 illustrates a transmission flow of a downlink packet according to embodiments of the disclosure;

FIG. 7B illustrates a packet flow between a C-UP and a baseband function (BBF) according to embodiments of the disclosure;

FIG. 8C illustrates a packet flow on a C-UP according to embodiments of the disclosure;

FIG. 9A illustrates a structure of a downlink packet on a user plane according to embodiments of the disclosure;

MODE FOR THE INVENTION

Hereinafter, the operation principle of the disclosure will be described in detail with reference to the accompanying drawings. The terms used in the disclosure are only used to describe specific embodiments, and are not intended to limit the disclosure. A singular expression may include a plural expression unless they are definitely different in a context. The terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

In the disclosure, embodiments will be described using terms employed in some communication standards (e.g., long term evolution (LTE) and new radio (NR) defined by the 3rd generation partnership project (3GPP)), but they are only for the sake of illustration. The embodiments of the disclosure may also be easily applied to other communication systems through modifications.

Figure 1:
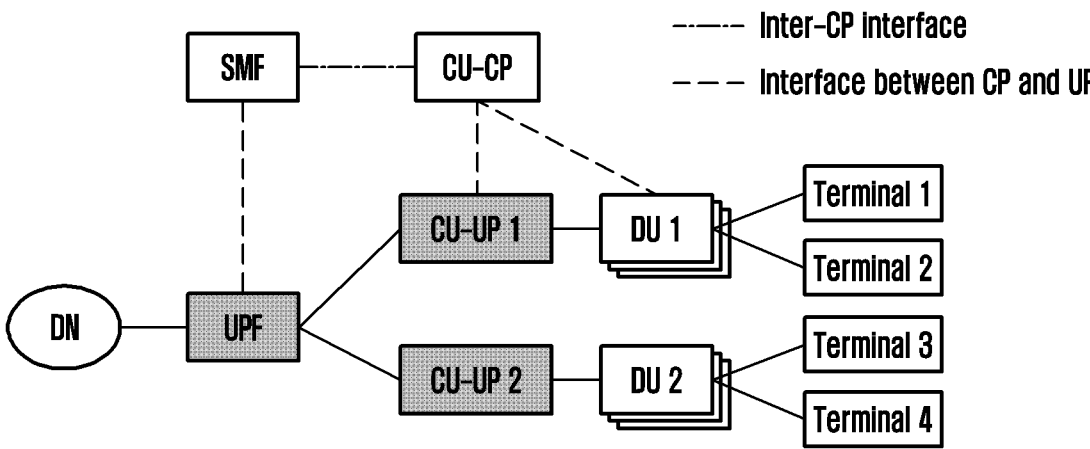
FIG. 1 illustrates a communication system according to embodiments of the disclosure.

FIG. 1 illustrates a communication system according to embodiments of the disclosure. FIG. 1 shows, as an example of some of nodes of a wireless communication system, a terminal, a distributed unit (DU), a centralized unit-user plane (CU-UP), a centralized unit-control plane (CU-CP), a user plane function (UPF), a session management function (SMF), and a data network (DN).

The terminal may access the data network via a base station and the UPF. In order to transmit or receive data via the UPF, the terminal is required to generate a packet data unit (PDU) session, and one PDU session may support one or more quality-of-service (QOS) flows. The terminal may be called "user equipment (UE)", "a mobile station", "a subscriber station", "a remote terminal", "a wireless terminal", "a user device", "a customer-premises equipment (CPE)", "an electronic device", or other terms having a technical meaning equivalent thereto.

The base station is a network infrastructure that provides wireless access to the terminal 210, as a radio access network (RAN) node. The base station may be called "an access point (AP)", "an eNodeB (eNB)", "a 5th generation (5G) node", "an gNodeB (a next generation node B, gNB)", "a wireless point", "a transmission/reception point (TRP)" or other terms having a technical meaning equivalent thereto. The base station may perform a function of mapping a QoS flow to a particular data radio bearer (DRB), based on information (e.g., QoS identifier (QFI) and a QoS profile) received from one (e.g., SMF) among control plane network functions of a core network (CN).

The base station may be implemented by distributed deployment of a centralized unit (CU) and a distributed unit (DU). The CU may be connected to one or more DUs so as to be configured to perform a function of a higher layer (e.g., at least one of a service data adaptation protocol (SDAP), a packet data convergence protocol (PDCP), or a radio resource control (RRC)) of an access network (AN). The DU may be configured to perform a function of a lower layer (e.g., at least one of a radio link control (RLC), a medium access control (MAC), or a physical (PHY)) of the access network. An interface between the CU and the DU may be called an F1 interface. The CU may be configured by a centralized unit-control plane (CU-CP) and a centralized unit-user plane (CU-UP). The CU-CP may include RRC and PDCP layers to be responsible for RRC signaling. The CU-UP may include SDAP and PDCP layers to be responsible for processing application data. An interface between the CU-CP and the CU-UP may be called an E1 interface.

The UPF is a network function (NF) responsible for a user plane in the core network (CN). The UPF may perform a function of mapping a packet of an internet protocol (IP) flow to a particular QoS flow belonging to a particular PDU session, based on information (e.g., at least one of a packet detection rule (PDR), a forwarding action rule (FAR), a quality-of-service enforcement rule (QER), or a usage reporting rule (URR)) received from one (e.g., SMF) among the control plane NFs.

The SMF is one of network functions (NFs) responsible for a control plane in the core network. The SMF may transmit, to the UPF and the base station, information (e.g., at least one of a QFI, a QoS profile, a PDR, a FAR, a QER, or a URR) required for ensuring QoS.

Figure 2:
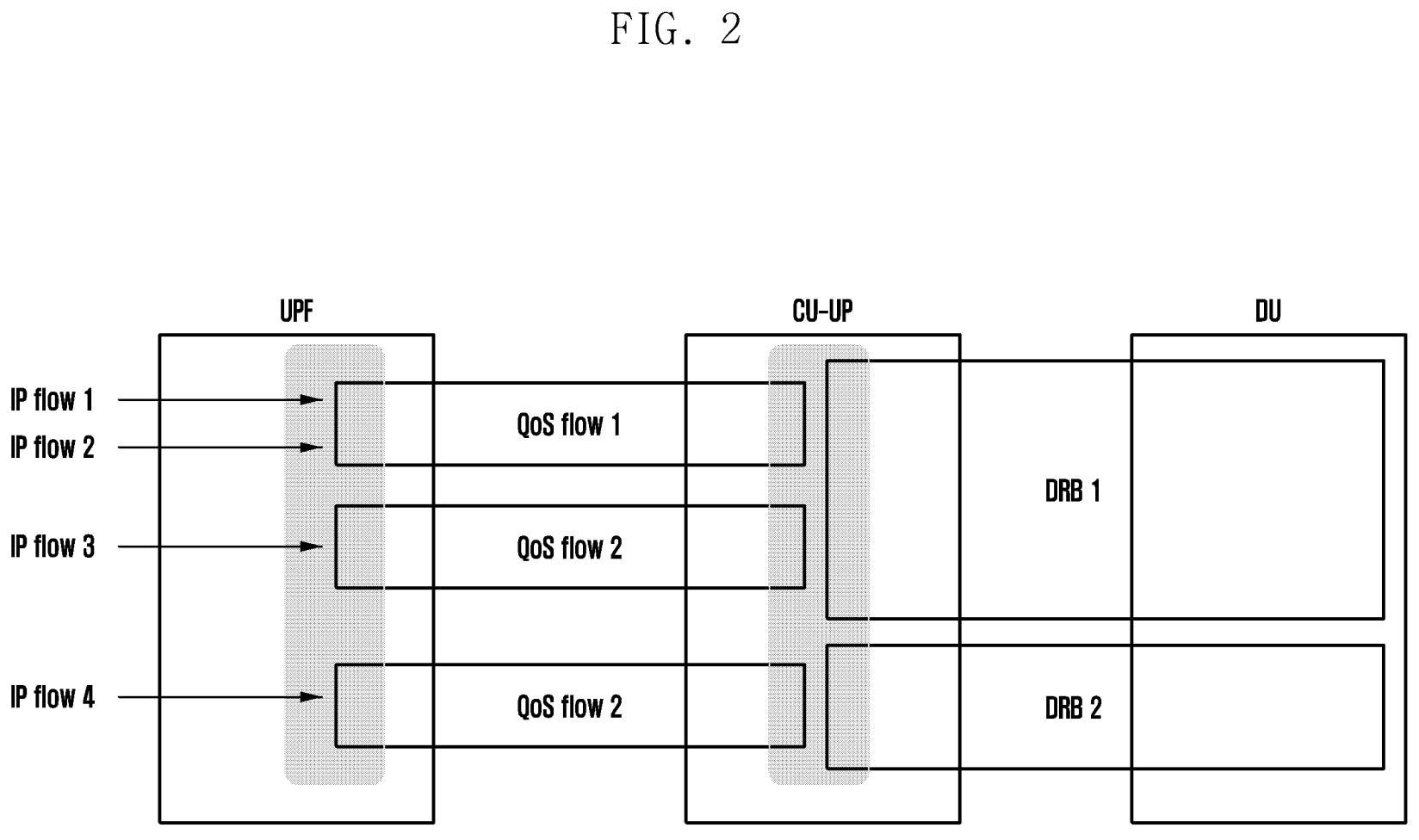

FIG. 2 illustrates a transmission flow of a downlink packet according to embodiments of the disclosure. Referring to FIG. 2, a process in which a downlink packet is transmitted via a user plane function (UPF) and a radio access network (RAN) is described.

The user plane function (UPF) may receive information on a packet processing rule from a session management function (SMF) that is a control plane network function. The information on the packet processing rule is to indicate a mapping rule between a downlink internet protocol (IP) flow and a QoS flow of a packet data unit (PDU) session, and may be based on QoS characteristics. More specifically, the information on the packet processing rule may include a packet detection rule (PDR), a forwarding action rule (FAR), a quality-of-service enforcement rule (QER), or a usage reporting rule (URR). The UPF may, in case that a downlink IP flow is received via a data network (DN), map same to a particular QoS flow according to a mapping rule and transmit the mapped IP flow and QoS flow to a centralized unit-user plane (CU-UP).

Next, the CU-UP may, in case that the particular QoS flow is received from the UPF, map the QoS flow to a particular data radio bearer (DRB) according to a mapping rule between the QoS flow and the DRB, and transmit the mapped QoS flow and DRB to a distributed unit (DU). In this case, the mapping rule between the QoS flow and the DRB may also be semi-statically configured by a centralized unit-control plane (CU-CP).

According to the above description, the UPF and the CU-UP maps an IP flow, a QoS flow, and a DRB according to a mapping rule based on QoS characteristics, and thus QoS enforcement is performed for IP flows having the same QoS characteristics with the goal of a QoS having the same level. Therefore, a conventional system fails to reflect a current QoS status outside a service provider network and a current radio QoS status that are dynamically changing. Furthermore, in the conventional system, entities (SMF and CU-CP) of a control plane generate a mapping rule and indicate same to entities of a user plane, and thus signaling overhead may occur. In addition, reflection of a dynamically changing current QoS status at a right time fails due to delays caused by a signaling procedure, and thus a user's quality of experience (QoE) may be reduced. Moreover, in order to configure a mapping rule, there may occur delays caused by an interface between the SMF and the CU-UP, an interface between the CU-CP and the CU-UP, and an interface between the UPF and the CU-UP.

FIG. 3 illustrates a transmission flow of a downlink packet according to embodiments of the disclosure. Referring to FIG. 3, a process in which a downlink packet is transmitted via a user plane function (UPF) and a radio access network (RAN) is described.

A base station of FIG. 3 has a structure in which a centralized unit (CU) and a distributed unit (DU) are integrated, and the base station may allocate even radio resources through a medium access control (MAC) layer. In this case, the base station generates a MAC PDU by allocating a radio resource among resources available in the MAC, based on the relative priorities of data radio bearers (DRBs). These priorities are defined only in a unit of a DRB, and thus fail to satisfy a QoS requirement in a unit of an IP flow.

With reference to FIG. 2 and FIG. 3, a process in which a downlink packet is transmitted to a terminal via a user plane function (UPF) and a radio access network (RAN) has been described. That is, the UPF and the RAN perform a 2-stage process of mapping an internet protocol (IP) flow to a QoS flow and mapping the QoS flow to a data radio bearer (DRB), so as to ensure quality of service (QOS) (this is also applied to uplink). However, defining, as separate functions, the UPF and the base station which may exist in the same physical position may cause inefficiency (e.g., an overlapping operation, a delay caused by an interface, or signaling/provisioning/updating of control information). In addition, the UPF and the base station perform mapping based on only QoS characteristic information semi-statically configured by a control plane network function of a core network, and thus fail to reflect a current QoS status outside a service provider network and a current radio QoS status of an IP flow. Therefore, a conventional scheme has a difficulty in adaptively performing QoS enforcement according to a dynamic current QoS status and channel situation. Therefore, the UPF and the base station (or some functions of the base station) are required to be configured as a single entity. In addition, the configured single entity is required to autonomously generate a rule of mapping a data radio bearer (DRB) to an IP flow, thereby minimizing signaling with control plane network functions. Furthermore, it is required to perform QoS enforcement reflecting a current QoS status outside a service provider network and a current radio QoS status that are dynamically changing.

Figure 4:
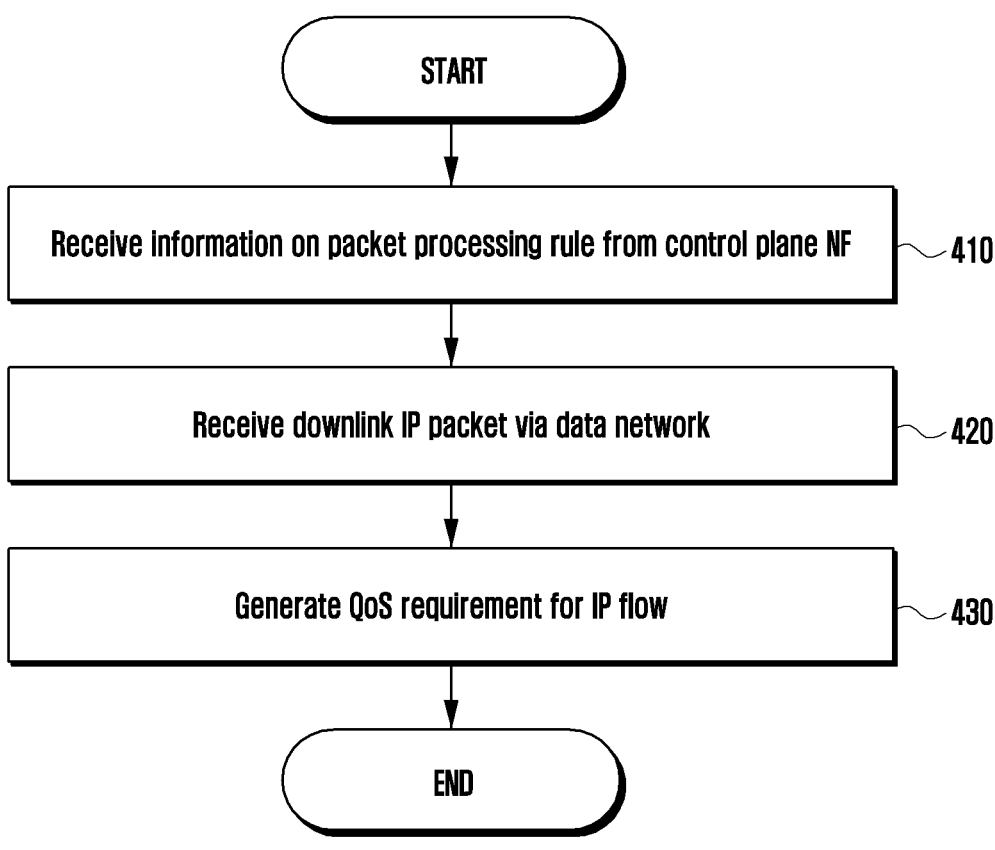
FIG. 4 illustrates an operation flow of a network node according to embodiments of the disclosure.

FIG. 4 illustrates an operation flow of a network node according to embodiments of the disclosure. Referring to FIG. 4, an operation of generating a quality-of-service (QOS) requirement by a network node into which a base station (or some functions of the base station) and a user plane function (UPF) are integrated is described.

The network node may be called a converged-user plane (C-UP). According to an embodiment, the network node may be a C-UP of a first type into which a function of the UPF and a function of a higher layer (e.g., at least one of a service data adaptation protocol (SDAP) or a packet data convergence protocol (PDCP)) of an access network (AN) are integrated. In this case, a lower layer function of the access network may be implemented in a baseband function (BBF). In addition, the C-UP of the first type may be connected to one or more BBFs. According to an embodiment, the network node may be a C-UP of a second type into which a function of the UPF and a function (e.g., at least one of an SDAP, a PDCP, a radio link control (RLC), a medium access control (MAC), or a physical (PHY)) of the access network are integrated.

Referring to FIG. 4, in operation 410, the network node may obtain information on a packet processing rule from a control plane network function. The information on the packet processing rule may be received based on an interface (e.g., N4 interface) between the network node and the control plane network function. In addition, the information on the packet processing rule may be obtained through a control session (e.g., N4 session) between the network node and the control plane network function, the control session being generated to correspond to a packet data unit (PDU) session. Here, the N4 interface and the N4 session are used as an example for convenience of explanation, but merely correspond to an example. Other interfaces and sessions may be defined in embodiments according to the disclosure.

Information required for generating the packet processing rule may include core-related information and radio access network (RAN)-related information. The core-related information may include at least one of IP packet-specific QoS information or a QoS profile. The RAN-related information may include at least one of configuration information or current status-related information of one or more DRBs included in a PDU session. According to an embodiment, the core-related information and the RAN-related information may be managed and generated by one control plane network function. According to an embodiment, the core-related information and the RAN-related information may be managed by separate control plane network functions, respectively. In this case, one control plane network function generates information on a packet processing rule through information exchange, and transmits same to the network node.

The information on the packet processing rule may include at least one of a packet detection rule (PDR), an access network treatment rule (ATR), a forwarding action rule (FAR), a quality-of-service enforcement rule (QER), or a usage reporting rule (URR).

The ATR of the packet processing rules may include at least one of identification information, QOS characteristic information, packet detection information, extraction information, forwarding information, or reflective QoS information.

The identification information may include at least one of information on a control session identifier (ID), information on a rule ID, or information on an IP flow ID. More specifically, the control session ID may be used to identify a control session associated with the obtained ATR. The rule ID may be used to identify the obtained ATR. The IP flow ID may be used to identify classified packets. That is, a particular ATR rule being applied to a particular IP flow may be indicated by a combination of the IP flow ID and the rule ID.

The QoS characteristic information may indicate a QoS characteristic required to be satisfied by a particular IP flow. More specifically, the QoS characteristic information may include at least one of information on a resource type, information on a packet delay budget, information on a packet error rate, information on a target data rate, or a QoS characteristic index.

As an example of information included in the QoS characteristic information, the resource type may indicate one of a guaranteed bit rate (GBR), a non-GBR, and a delay critical GBR. A priority level may indicate a priority related to resource scheduling for an IP flow. The packet delay budget may indicate a delay requirement for an IP flow. The packet error rate may indicate an error rate requirement for an IP flow. The target data rate may indicate a data rate requirement for an IP flow. The QoS characteristic index may indicate at least one of a resource type, a priority level, a packet delay budget, a packet error rate, or a packet data rate, which is indicated together with the QoS characteristic index. That is, the QoS characteristic index may be associated with values of QoS characteristics indicated together. Therefore, the control plane network function may indicate only the QoS characteristic index without separately indicating values of QOS characteristics later, thereby reducing message overhead.

The packet detection information may be used to classify a received IP packet. That is, the network node may identify a packet included in a particular IP flow, based on the packet detection information. More specifically, the packet detection information may include at least one of information on a source interface, information on a terminal IP address, information on a network instance, core network (CN) tunnel information, information on a packet filter set, information on an application ID, information on a QoS flow ID (QFI), Ethernet PDU session information, or frame route information. For example, the network node may identify an IP flow including a received IP packet by combining a terminal IP address, a network instance, a CN tunnel, a packet filter set, an application ID, a QFI, and an Ethernet PDU session. A packet included in a particular IP flow may also be identified based on the PDR. In this case, the ATR may not include the packet detection information.

The extraction information may be used to identify service provider network-outside QoS information for an IP flow. Here, the service provider network-outside QoS information may correspond to QoS information between the network node and a source node of the IP flow. More specifically, the extraction information may include at least one of structural position information of the service provider network-outside QoS information included in a packet, length information of the service provider network-outside QoS information, and information on an interpretation method of the service provider network-outside QoS information. For example, if the service provider network-outside QoS information is a hop count of an IP header, the extraction information may indicate that the service provider network-outside QoS information is included in the IP header. In addition, the extraction information may indicate a bit length of information relating to the hop count. In addition, the extraction information may indicate that the service provider network-outside QoS information is information relating to the number of intermediate devices passing between a source node and the network node. As another example, if the service provider network QoS information is timestamp of a real time transport protocol (RTP)/transmission control protocol (TCP) header, the extraction information may indicate that the service provider network-outside QoS information is included in the RTP/TCP header. In addition, the extraction information may indicate a bit length of information relating to timestamp. In addition, the extraction information may indicate that the service provider network-outside QoS information is information relating to a packet transmission time point at a source node. As another example, if the service provider network-outside QoS information is QoS information available in a MEC server, the extraction information may indicate that the QoS information available in the MEC server is included in a size of N bits in a particular position of an IP packet. As another example, if the service provider network-outside QoS information is QOS information available in a QUIC, the extraction information may indicate that the QoS information available in the QUIC is included in a size of M bits in a particular position of an IP packet. As another example, if the service provider network-outside QoS information is information of an INT header, the extraction information may indicate that at least one of pieces of information relating to a hop count and a delay is included in a size of K bits in the INT header. As another example, if the service provider network-outside QoS information is information collected in each network equipment via network AI, the extraction information may indicate that at least one of pieces of information relating to an IP flow-specific delay, queue status, bit rate, and throughput is included in a size of L bits in a particular position of an IP packet.

The forwarding information may indicate insertion of an outer header (e.g., a general packet radio service tunneling protocol (GTP), a user data protocol (UDP), or an IP). The forwarding information may include information on outer header creation. If outer header creation information is included in the ATR, an outer header may include information on a baseband function (BBF) to which an IP flow is transmitted. For example, if an IP flow is transmitted to a first BBF among one or more BBF connected to the network node, an outer IP header may include an IP address of the network node as a source internet protocol (SIP) and an IP address of the first BBF as a destination internet protocol (DIP). The forwarding information may be included in the ATR if the network node is a C-UP of the first type.

The reflective QoS information may include at least one of information on reflective mapping indication (RMI) marking or information on L2 header creation. The network node may insert information on an RMI in an L2 (e.g., a packet data convergence protocol (PDCP) or a service data adaptation protocol (SDAP)) header, based on the received reflective QOS information. The RMI may be information indicating, to a terminal, whether mapping between an IP flow and a data radio bearer (DRB) is changed. For example, the RMI is information having 1 bit, 0 may indicate that mapping between an IP flow and a DRB has not been changed, and 1 may indicate that mapping between an IP flow and a DRB has been changed. More specifically, if the RMI is 1, the terminal may identify, based on a received packet, an IP flow of the packet and a DRB through which the packet is received. In this case, the terminal may store changed mapping information between the identified IP flow and DRB. In addition, the terminal may identify a DRB corresponding to an uplink IP flow, based on the stored mapping information.

The above pieces of information included in the ATR may be configured as shown in Table 1 below. However, Table 1 merely corresponds to an example. Some information may be omitted, and necessary information may be added.

TABLE 1

| ATR | | |
|---|---|---|
| | Attribute | Description |
| | Control session ID | Identification of control session associated with ATR |
| | Rule ID | Identifier indicating ATR |
| | IP flow ID | Value of IP flow identifier |
| Packet detection information | Source interface | Access side, core side, SMF, value of N6-LAN |
| | Terminal IP address | IPv4 address and/or IPv6 prefix with prefix length |
| | Network instance | Network instance related to received packet |
| | CN tunnel information | CN tunnel information (e.g., fully qualified-tunnel endpoint identifier (F-TEID)) on interface with another user plane network function |
| | Packet filter set | |
| | Application ID | |
| | QoS flow ID | 5G QoS identifier (5QI) or non-standardized QoS flow ID (QFI) |
| | Ethernet PDU session information | This indicates all (DL) Ethernet packets matching Ethernet PDU session |
| | Frame route information | |
| | Resource type | GBR/non-GBR/delay critical GBR |
| | Priority level | |
| | Packet delay budget | Delay requirement for IP flow |
| | Packet error rate | Error rate requirement for IP flow |
| | Target data rate | Data rate requirement for IP flow |

TABLE 1-continued

| ATR | |
| --- | --- |
| Attribute | Description |
| QoS characteristic index | Index of QoS characteristic set |
| Extraction information | Information for extracting QoS between source and C-UP |
| Outer header creation | This indicates outer header creation |
| L2 header creation | This indicates L2 header creation |
| RMI marking | Packet marking for L2 header in downlink |

In operation 420, the network node may receive a down-link internet protocol (IP) packet via a data network. The received IP packet may include service provider network-outside QoS information. The service provider network-outside QoS information may correspond to QoS information between the network node and a source node of an IP flow including the received IP packet. More specifically, the service provider network-outside QoS information may include at least one of a hop count of an IP header, timestamp of a real time transport protocol (RTP)/transmission control protocol (TCP) header, QoS information available in a situation (e.g., a multi-access edge computing (MEC) server or a quick UDP internet connection (QUIC)) controllable by an operator, information (e.g., hop count and delay) of an in-network telemetry (INT) header, information on a QoS requirement based on information (e.g., IP flow-specific delay, queue status, bit rate, and throughput) collected in each network equipment via network artificial intelligence (AI), or information collected in each network equipment and transferred to the network node.

In operation 430, the network node may generate a QoS requirement for an IP flow.

First, the network node may identify an IP packet to which an ATR is applied. According to an embodiment, the network node may identify an IP packet included in a particular IP flow, based on a PDR. In this case, an ATR corresponding to the particular IP flow may be applied to the identified IP packet. That is, since a PDR includes a rule ID for a particular ATR and is thus associated with the ATR, the network node may recognize an ATR applied to an identified IP packet, based on a PDR. According to an embodiment, the network node may identify an IP packet included in a particular IP flow, based on packet detection information. In this case, an ATR corresponding to the particular IP flow may be applied to the identified IP packet. That is, since an ATR is associated with information on a rule ID for the ATR and packet detection information, the network node may recognize an ATR applied to an identified IP packet, based on packet detection information.

Next, the network node may identify service provider network-outside QoS information for an IP flow in the received IP packet, based on extraction information included in the ATR. For example, if the extraction information indicates that information relating to a hop count exists in a size of N bits in an IP header, the network node may identify the number of the hop count, based on the information relating to the hop count which has N bits and is included in the IP header. As another example, if the extraction information indicates that information relating to timestamp exists in a size of M bits in an RTP/TCP header, the network node may identify a packet transmission time point at a source node, based on the information relating to timestamp which has M bits and is included in the RTP/TCP header.

In case that service provider network-outside QoS information is identified as described above, the network node may generate a QoS requirement for an IP flow, based on QoS characteristic information included in the ATR and the identified service provider network-outside QoS information. The QoS requirement may mean a configuration related to a QoS required to be satisfied to transmit the IP flow in a radio interval. More specifically, the QoS requirement may include at least one of a priority, a delay, a bit rate, or an error rate for the IP flow in a radio interval.

In relation to the generated QoS requirement, different QoS requirements may be generated for IP flows (e.g., a first IP flow and a second IP flow) having the same QoS characteristics according to service provider network-outside QoS information. For example, if a hop count of the first IP flow is higher than that of the second IP flow, the network node may generate a higher QoS requirement for the first IP flow so as to compensate for a transmission delay having occurred while the first IP flow has passed through many hops outside a service provider network. However, this merely corresponds to an example, and even in the same case, the network node may generate a higher QoS requirement for the second IP flow according to implementation.

The network node may store a generated QoS requirement for an IP flow in association with an IP flow ID. According to an embodiment, information on a QoS requirement may be a format in which the type of each field and an applicable value are predetermined. According to an embodiment, information on a QoS requirement may be a format (e.g., Jason type) in which pieces of necessary information are serially listed without determined fields. The generated QoS requirement may be transmitted to a terminal or another network.

In the above example, one IP flow corresponding to one QoS requirement has been described, but the disclosure is not limited thereto. For example, one or more IP flows may correspond to one QoS requirement, and one IP flow may correspond to one or more QoS requirements.

Figure 5:
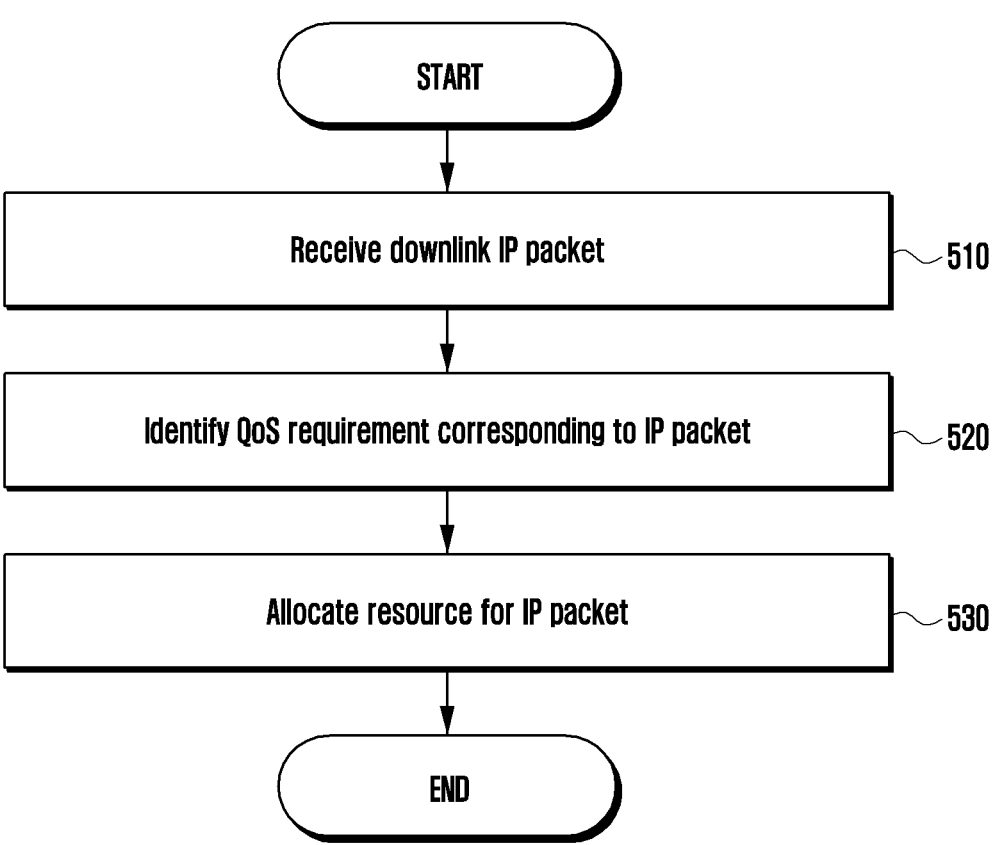
FIG. 5 illustrates an operation flow of a network node according to embodiments of the disclosure.

FIG. 5 illustrates an operation flow of a network node according to embodiments of the disclosure. Referring to FIG. 5, an operation of performing radio quality-of-service (QOS) enforcement (RQE) for a received downlink packet by a network node into which a base station (or some functions of the base station) and a user plane function (UPF) are integrated is described. The network node of FIG. 5 may be a converged-user plane (C-UP) of the first type or a C-UP of the second type.

Referring to FIG. 5, in operation 510, the network node may receive a downlink internet protocol (IP) packet. The network node may identify an IP flow corresponding to the received downlink IP packet. More specifically, according to an embodiment, the network node may identify an IP flow corresponding to the received IP packet, based on a packet detection rule (PDR). According to an embodiment, the network node may identify an IP flow corresponding to the received IP packet, based on packet detection information included in an ATR.

In operation 520, the network node may identify a QoS requirement corresponding to the identified IP flow. More specifically, the network node may identify a QoS requirement corresponding to the identified IP flow, based on stored mapping information between the IP flow and the QoS requirement.

According to an embodiment, the network node may update a QoS requirement. The network node may obtain service provider network-outside QoS information from the received IP packet, based on extraction information of the ATR for the IP flow. The network node may update a QoS requirement for the IP flow, based on the obtained outside QoS information and QoS characteristic information for the IP flow included in the ATR. According to an embodiment, the network node may periodically update a QoS requirement.

In operation 530, the network node may allocate a resource. The network node may allocate a resource for the IP packet, based on at least one of the identified (or updated) QoS requirement, radio interval QoS information for the IP flow, or a channel situation. More specifically, the radio interval QoS information for the IP flow may include at least one of information (queue status, bit rate, and delay) on the IP flow of the network node, control information (e.g., a queue status of DRBs of a PDU session in a baseband function (BBF), a bit rate, a delay, and a response (ACK/NACK) for a data packet) between the network node and the BBF, resource allocation information in a medium access control (MAC) layer, or information on a packet error rate in a lower layer (e.g., PHY). The channel situation may include at least one of channel state information (CSI) or reference signal received power (RSRP).

According to an embodiment, if the network node is a C-UP of the first type, the network node may identify a data ratio bearer (DRB) corresponding to the IP packet. More specifically, the network node may identify a DRB for the IP flow including the IP packet, based on at least one of the identified (or updated) QoS requirement, radio interval QoS information for the IP flow, or a channel situation. In this case, the network node may generate mapping information between the IP flow and the DRB. That is, in the disclosure, a network node of a user plane may autonomously generate and manage mapping information between an IP flow and a DRB, thereby preventing overhead, delays, and quality-of-service (QoE) reduction caused by signaling with control plane network functions, and reflecting a dynamically changing current QoS status. In addition, the network node may insert, in a packet included in the IP flow, an outer header (e.g., a general packet radio service tunneling protocol (GTP), a user data protocol (UDP), or an IP). For example, an outer IP header may include a source IP address (SIP) and a destination IP address (DIP). Here, the SIP may correspond to an IP address of the network node, and the DIP may correspond to an IP address of a BBF to which a packet is to be transmitted.

According to an embodiment, if the network node is a C-UP of the second type, the network node may identify a radio resource corresponding to the IP flow. More specifically, the network node may allocate a radio resource for each IP flow and generate a protocol data unit (MAC PDU) that is a transmission unit, based on at least one of the identified (or updated) QoS requirement, radio interval QoS information for the IP flow, or a channel situation. The network node may transmit a packet included in the IP flow to a terminal through the identified radio resource. In the above embodiment, the network node is described to be classified as a C-UP of the first type and a C-UP of the second type, but this merely corresponds to an example.

In addition, the network node may insert a reflective mapping indication (RMI) in a L2 (packet data convergence protocol (PDCP) or service data adaptation protocol (SDAP)) header of a packet. The RMI may be information indicating, to a terminal, whether mapping between an IP flow and a data radio bearer (DRB) is changed. For example, the RMI is information having 1 bit, 0 may indicate that mapping between an IP flow and a DRB has not been changed, and 1 may indicate that mapping between an IP flow and a DRB has been changed. More specifically, if the RMI is 1, the terminal may identify, based on a received packet, an IP flow of the packet and a DRB through which the packet is received. In this case, the terminal may store changed mapping information between the identified IP flow and DRB. In addition, the terminal may identify a DRB corresponding to an uplink IP flow, based on the stored mapping information. That is, the network node may indicate whether mapping information is changed to the terminal by using information of 1 bit, thereby reducing load (e.g., power consumption) on the terminal required to identify IP flows and DRBs of all received IP packets.

Figure 6A:
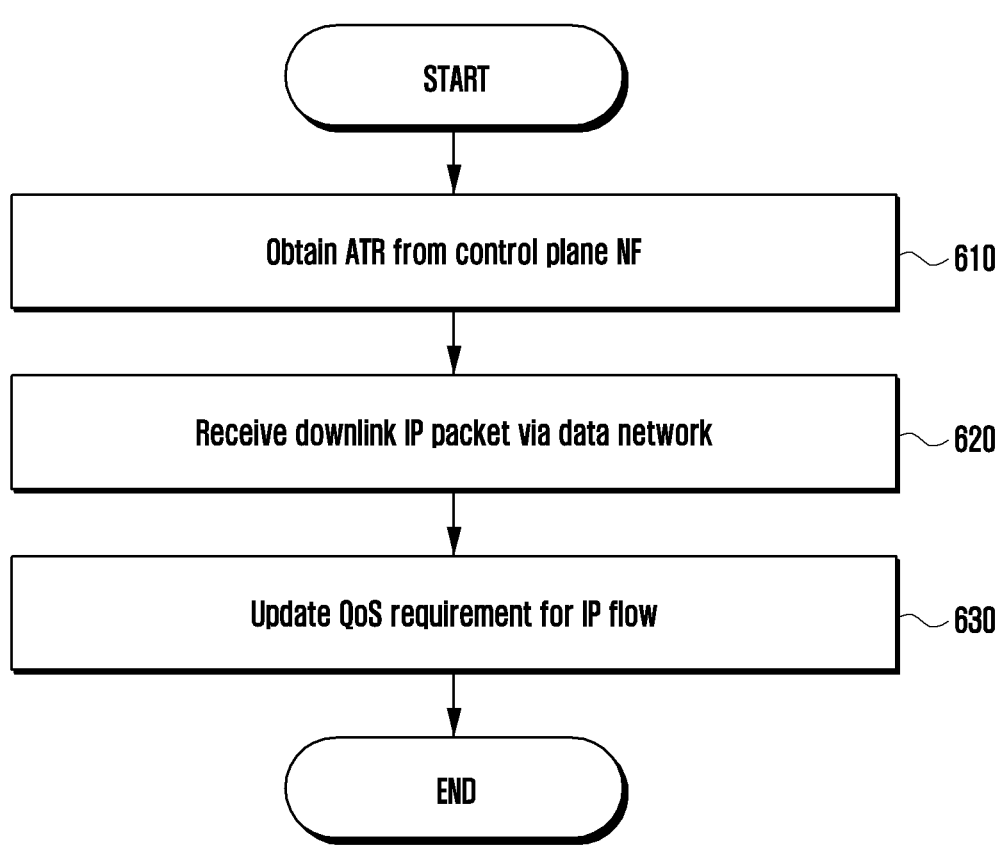
FIG. 6A illustrates an operation flow of a network node according to embodiments of the disclosure.

FIG. 6A illustrates an operation flow of a network node according to embodiments of the disclosure. Referring to FIG. 6A, an operation of updating a quality-of-service (QOS) requirement for an internet protocol (IP) flow by a network node into which a base station (or some functions of the base station) and a user plane function (UPF) are integrated is described. A procedure of updating a QoS requirement may be triggered by a control plane network function according to mobility of a terminal, a state (RRC connected, RRC inactive, or RRC idle) change of the terminal, etc. in case that mapping between an IP flow and QoS characteristics is changed. The network node of FIG. 6 may be a converged-user plane (C-UP) of the first type or a C-UP of the second type.

Referring to FIG. 6A, in operation 610, the network node may obtain an ATR from a control plane network function. The ATR may include at least one of identification information, QOS characteristic information, packet detection information, extraction information, forwarding information, or reflective QoS information. The network node may update an existing ATR, based on the obtained ATR. More specifically, the network node may compare a rule ID of an ATR obtained from a control plane network function with rule IDs of an existing ATR. If there is the same rule ID as the obtained rule ID, the network node may update information included in the ATR having the rule ID to information included in the obtained ATR.

In operation 620, the network node may receive a downlink IP packet via a data network.

The received IP packet may include service provider network-outside QoS information. The service provider network-outside QOS information may correspond to QoS information between the network node and a source node of an IP flow including the received IP packet. More specifically, the service provider network-outside QoS information may include at least one of a hop count of an IP header, timestamp of a real time transport protocol (RTP)/transmission control protocol (TCP) header, QoS information available in a situation (e.g., a multi-access edge computing (MEC) server or a quick UDP internet connection (QUIC)) controllable by an operator, information (e.g., hop count and delay) of an in-network telemetry (INT) header, information on a QoS requirement based on information (e.g., IP flow-specific delay, queue status, bit rate, and throughput) collected in each network equipment via network artificial intelligence (AI), or information collected in each network equipment and transferred to the network node.

In operation 630, the network node may update a QoS requirement for an IP flow.

First, the network node may classify the received IP packet to identify whether the received IP packet corresponds to an IP flow corresponding to the updated ATR. More according to an embodiment, the network node may identify whether the received IP packet corresponds to an IP flow corresponding to the updated ATR, based on a packet detection rule (PDR). According to an embodiment, the network node may identify whether the received IP packet corresponds to an IP flow corresponding to the updated ATR, based on packet detection information included in an ATR.

If the received IP packet corresponds to an IP flow corresponding to the updated ATR, the network node may identify service provider network-outside QoS information for the IP flow in the received IP packet, based on extraction information included in the updated ATR. For example, if the extraction information indicates that information relating to a hop count exists in a size of N bits in an IP header, the network node may identify the number of the hop count, based on the information relating to the hop count which has N bits and is included in the IP header. As another example, if the extraction information indicates that information relating to timestamp exists in a size of M bits in an RTP/TCP header, the network node may identify a packet transmission time point at a source node, based on the information relating to timestamp which has M bits and is included in the RTP/TCP header.

Next, the network node may update a QoS requirement for the IP flow, based on QoS characteristic information included in the updated ATR and the identified service provider network-outside QoS information. The QoS requirement may include at least one of a priority, a delay, a bit rate, or an error rate for the IP flow in a radio interval. The network node may store the updated QoS requirement for the IP flow in association with an IP flow ID.

Referring to FIG. 6, the network node performs operation 620 to perform an operation of receiving a downlink IP packet, but the operation may be omitted. For example, the network node may obtain service provider network-outside QoS information from a previously received IP packet for a corresponding IP flow, and perform operation 630, based on the same information.

Figure 6B:
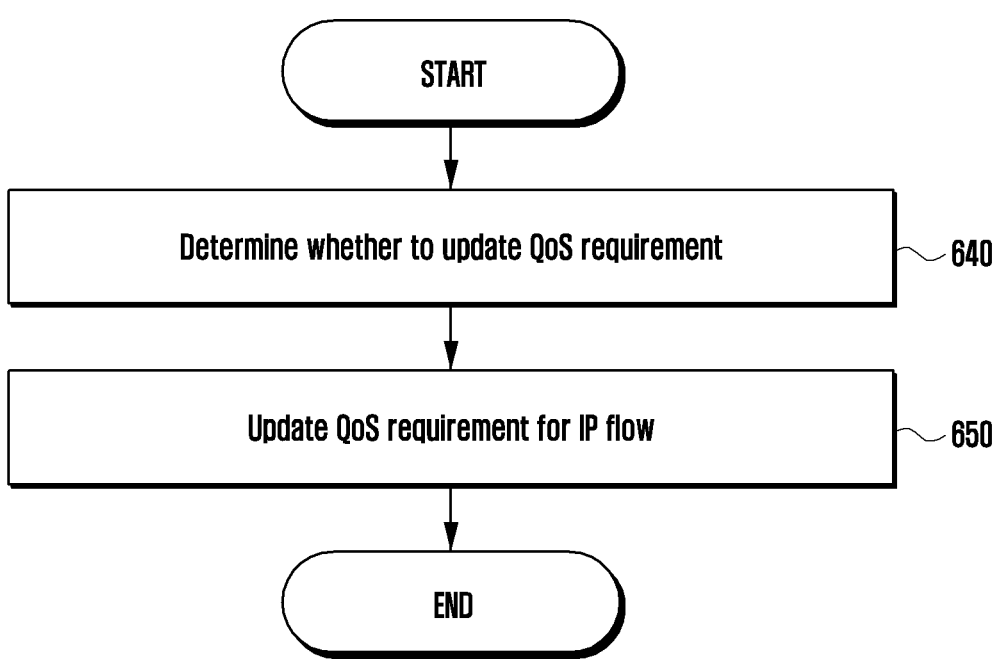
FIG. 6B illustrates an operation flow of a network node according to embodiments of the disclosure.

FIG. 6B illustrates an operation flow of a network node according to embodiments of the disclosure. Referring to FIG. 6B, an operation of updating a quality-of-service (QOS) requirement for an internet protocol (IP) flow by a network node into which a base station (or some functions of the base station) and a user plane function (UPF) are integrated is described. The network node of FIG. 6B may be a converged-user plane (C-UP) of the first type or a C-UP of the second type.

Referring to FIG. 6B, in operation 640, the network node may determine whether to update a QoS requirement for an IP flow.

First, the network node may receive an IP packet included in an IP flow. The IP packet may include service provider network-outside QoS information for the IP flow. The service provider network-outside QoS information may correspond to QoS information between the network node and a source node of the IP flow including the received IP packet. More specifically, the service provider network-outside QoS information may include at least one of a hop count of an IP header, timestamp of a real time transport protocol (RTP)/transmission control protocol (TCP) header, QoS information available in a situation (e.g., a multi-access edge computing (MEC) server or a quick UDP internet connection (QUIC)) controllable by an operator, information (e.g., hop count and delay) of an in-network telemetry (INT) header, information on a QoS requirement based on information (e.g., IP flow-specific delay, queue status, bit rate, and throughput) collected in each network equipment via network artificial intelligence (AI), or information collected in each network equipment and transferred to the network node.

Next, the network node may identify service provider network-outside QoS information for the IP flow including the received IP packet, based on extraction information of an access network treatment rule (ATR) corresponding to the IP flow. For example, if information relating to a hop count existing in a size of N bits in an IP header is indicated, the network node may identify the number of the hop count, based on the information relating to the hop count which has N bits and is included in the IP header. As another example, if the extraction information indicates that information relating to timestamp exists in a size of M bits in an RTP/TCP header, the network node may identify a packet transmission time point at a source node, based on the information relating to timestamp which has M bits and is included in the RTP/TCP header.

Next, the network node may determine whether to update a QoS requirement for the IP flow. More specifically, the network node may determine whether to update a QoS requirement for the IP flow, based on the identified service provider network-outside QoS information and a threshold. For example, if the number of a hop count used to generate (update) an existing QoS requirement is 4, a pre-configured threshold is 2, and the number of a hop count identified in the received IP packet exceeds 6 (or is smaller than 2), the network node may determine to update the QoS requirement. As another example, if the value of timestamp used to generate (update) an existing QoS requirement is 10, a pre-configured threshold is 3, and the value of timestamp identified in the received IP packet exceeds 13 (or is smaller than 7), the network node may determine to update the QoS requirement. That is, in order to adaptively determine a QoS requirement according to a situation outside a service provider network, the network node may determine to update the QoS requirement, in case that service provider network-outside QoS information changes by a particular threshold or higher.

In operation 650, the network node may update a QoS requirement for an IP flow. More specifically, in case that update of a QoS requirement is determined, the network node may update a requirement for an IP flow, based on QoS characteristic information included in an ATR and the identified service provider network-outside QoS information. The QoS requirement may include at least one of a priority, a delay, a bit rate, or an error rate for the IP flow in a radio interval. In this case, the network node may store the updated QoS requirement for the IP flow in association with an IP flow ID.

With reference to FIG. 6A and FIG. 6B, a procedure of updating a QoS requirement in case that a new ATR is received and a procedure of updating a QoS requirement according to change of service provider network-outside QoS information have been described, respective, but this merely corresponds to an example. In embodiments according to the disclosure, the two methods may be used in combination.

Figure 7A:
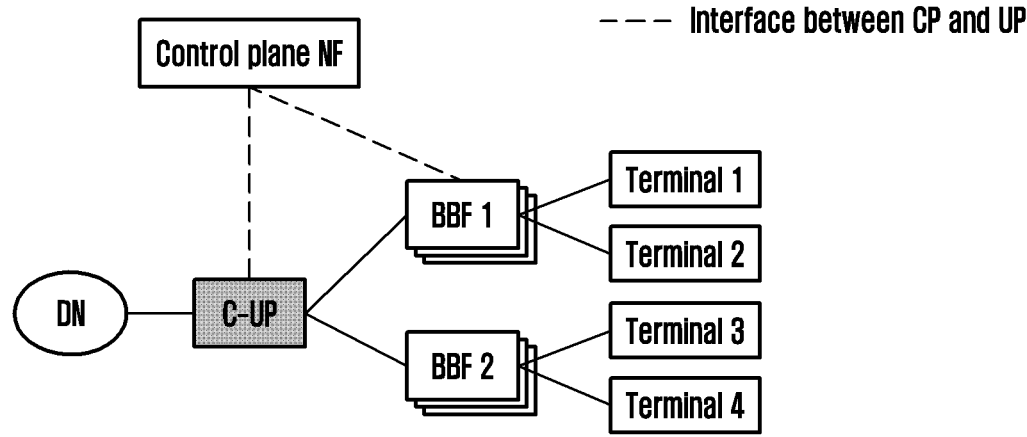
FIG. 7A illustrates a communication system including a converged-user plane (C-UP) according to embodiments of the disclosure.

FIG. 7A illustrates a communication system including a converged-user plane (C-UP) according to embodiments of the disclosure. In FIG. 7A, a communication system for a C-UP of the first type is illustrated as an example.

Referring to FIG. 7A, the communication system includes, for example, a data network (DN), a C-UP, baseband functions (BBFs) (BBF1 and BBF2), terminals (UE1, UE2, UE3, and UE4), and a control plane network function (control plane function). Here, the control plane network function may be a session management function (SMF). However, this merely corresponds to an example, a different network function may responsible for the control plane network function, and in this case, an interface and a control session between the network function and the C-UP may be newly configured.

FIG. 7B illustrates a packet flow between a converged-user plane (C-UP) and a baseband function (BBF) according to embodiments of the disclosure. FIG. 7B is based on the communication system of FIG. 7A.

Referring to FIG. 7B, the C-UP may receive an internet protocol (IP) flow via the data network. In this case, the C-UP may identify a quality-of-service (QOS) requirement corresponding to the received IP flow, based on a packet detection rule (PDR) or packet detection information included in an access network treatment rule (ATR). The C-UP may generate mapping information between the IP flow and a data radio bearer (DRB), based on the identified requirement, radio interval QoS information, and a channel situation. The mapping information between the IP flow and the DRB may be changed according to service provider network-outside QoS information and the radio interval QoS information. For example, if the service provider network-outside QoS information is changed to exceed a threshold, a network node may update the QoS requirement. In this case, the network node may update the mapping information between the IP flow and the DRB, based on the updated QoS requirement and the radio interval QoS information. As another example, if the radio interval QoS information is changed, the network node may update the mapping information between the IP flow and the DRB, based on the QoS requirement and the changed radio interval QoS information. That is, mapping information between an IP flow and a DRB may be changed by service provider network-outside QoS information and radio interval QoS information that are dynamically changing. The C-UP may transmit the IP flow to the baseband function (BBF) through the particular DRB, based on the generated mapping information. That is, according to such a communication system, a C-UP that performs scheduling generates DRB mapping information for an IP flow, thereby enabling more sophisticated QoS control and improving resource efficiency and a user's quality of experience (QoE).

Figure 8A:
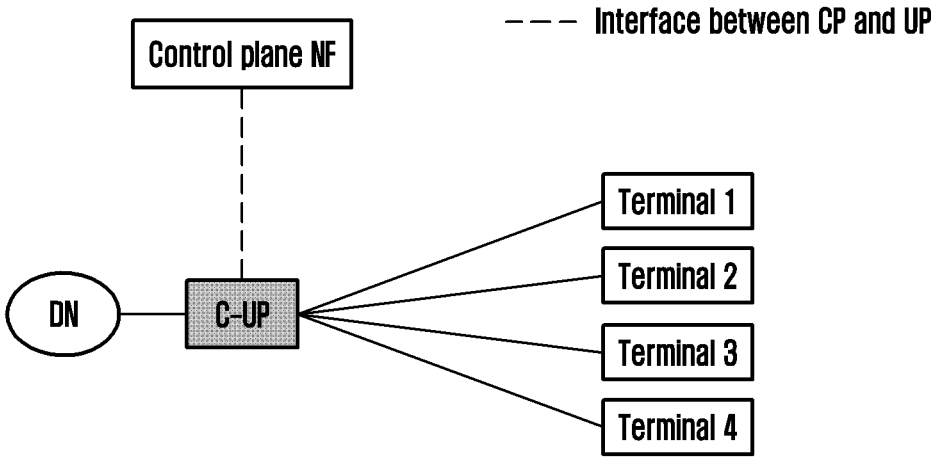
FIG. 8A illustrates a communication system including a C-UP according to embodiments of the disclosure.

FIG. 8A illustrates a communication system including a converged-user plane (C-UP) according to embodiments of the disclosure. In FIG. 8A, a communication system for a C-UP of the second type is illustrated as an example.

Referring to FIG. 8A, the communication system includes, for example, a data network (DN), a C-UP, terminals (UE1, UE2, UE3, and UE4), and a control plane network function. Here, the control plane network function may be a session management function (SMF). However, this merely corresponds to an example, a different network function may responsible for the control plane network function, and in this case, an interface and a control session between the network function and the C-UP may be newly configured.

Figure 8B:
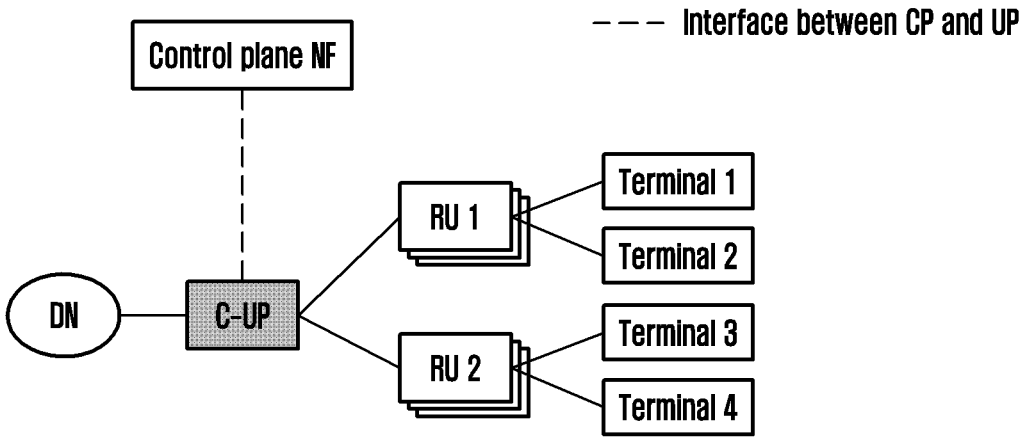
FIG. 8B illustrates a communication system including a C-UP according to embodiments of the disclosure.

FIG. 8B illustrates a communication system including a C-UP according to embodiments of the disclosure. In FIG. 8B, a communication system for a C-UP of the second type is illustrated as an example. Referring to FIG. 8A, the communication system includes, for example, a data network (DN), a C-UP, radio units (RUs), terminals (UE1, UE2, UE3, and UE4), and a control plane network function. Referring to FIG. 8A, in order to minimize the installation cost of a base station, the C-UP may be connected to one or more RUs via a wired (or wireless) network, and topographically distributed one or more RUs may be arranged to cover a particular region. In this case, a fronthaul for communication between the C-UP and a RU may be defined, and an interface (e.g., an enhanced common public radio interface (eCPRI) or radio over Ethernet (ROE)) may be used to operate such a fronthaul.

The C-UP may be responsible for a higher layer function of an access network. For example, the C-UP may perform at least one of service data adaptation protocol (SDAP) functions, packet data convergence protocol (PDCP) functions, radio link control (RLC) functions, medium access control (MAC) functions, or some of physical (PHY) functions. Some of the PHY functions are functions performed in a relatively higher stage among the PHY functions, and for example, may include channel encoding (or channel decoding), scrambling (or descrambling), modulation (or demodulation), and layer mapping (or layer demapping). The RU may be responsible for a lower layer function of the access network. For example, the RU may perform at least one of some of the PHY functions or radio frequency (RF) functions. Some of the PHY functions are functions performed in a relatively lower stage among the PHY functions, and for example, may include inverse Fourier transform (IFFT) (or FFT), cyclic prefix (CP) insertion (or CP removal), and digital beamforming.

FIG. 8C illustrates a packet flow on a C-UP according to embodiments of the disclosure. FIG. 8C is based on the communication system of FIG. 8A or FIG. 8B.

Referring to FIG. 8C, the C-UP may receive an internet protocol (IP) flow via the data network (DN). In this case, the C-UP may identify a quality-of-service (QOS) requirement corresponding to the received IP flow, based on a packet detection rule (PDR) or packet detection information included in an access network treatment rule (ATR). The C-UP may allocate a radio resource for the IP flow, based on the identified requirement, radio interval QoS information, and a channel situation. That is, according to such a communication system, a C-UP that performs scheduling allocates a radio resource, thereby enabling more sophisticated QoS control and improving resource efficiency and a user's quality of experience (QoE).

Figure 9A:
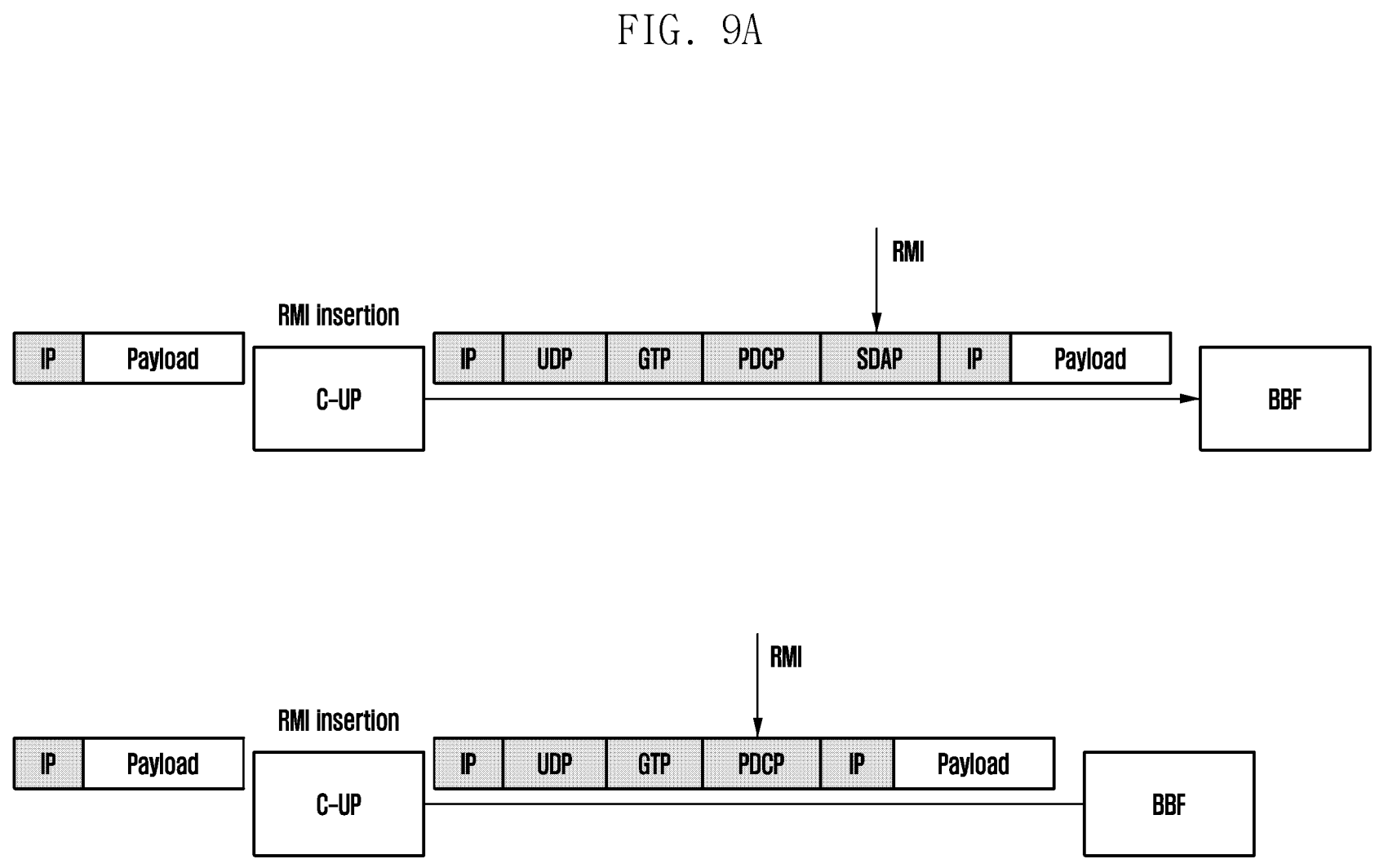

FIG. 9A illustrates a downlink packet structure on a user plane according to embodiments of the disclosure. In FIG. 9A, a base station is based on a communication system for a C-UP of the first type. In the communication system for a C-UP of the first type, the C-UP may generate and store mapping information between an IP flow and a data radio bearer (DRB) corresponding thereto.

A terminal may identify an IP flow of a received packet, based on a header of the packet. In addition, the terminal may identify a data radio bearer through which the packet is received. That is, the terminal may generate mapping information between the IP flow and the DRB of the received packet. In this case, the C-UP may indicate whether mapping between the IP flow and the DRB is changed, to the terminal through a reflective mapping indication (RMI) field of a packet. For example, the RMI is information having 1 bit, 0 may indicate that mapping between the IP flow and the DRB has not been changed, and 1 may indicate that mapping between the IP flow and the DRB has been changed. More specifically, if the RMI is 1, the terminal may identify, based on a received packet, an IP flow of the packet and a DRB through which the packet is received. In this case, the terminal may store changed mapping information between the identified IP flow and DRB. In addition, the terminal may identify a DRB corresponding to an uplink IP flow, based on the stored mapping information. That is, the C-UP may indicate whether mapping information is changed to the terminal by using information of 1 bit, thereby reducing load (e.g., power consumption) on the terminal required to identify IP flows and DRBs of all received IP packets. Referring to FIG. 9A, such an RMI field may be included in an L2 header, such as a service data adaptation protocol (SDAP) or a packet data convergence protocol (PDCP). The SDAP or PDCP merely corresponds to an example, and embodiments according to the disclosure are not limited thereto.

FIG. 9A is based on a communication system for a C-UP of the first type, but this merely corresponds to an example, and a C-UP of the second type may also perform an operation of inserting an RMI field in a SDAP or PDCP header.

Figure 9B:
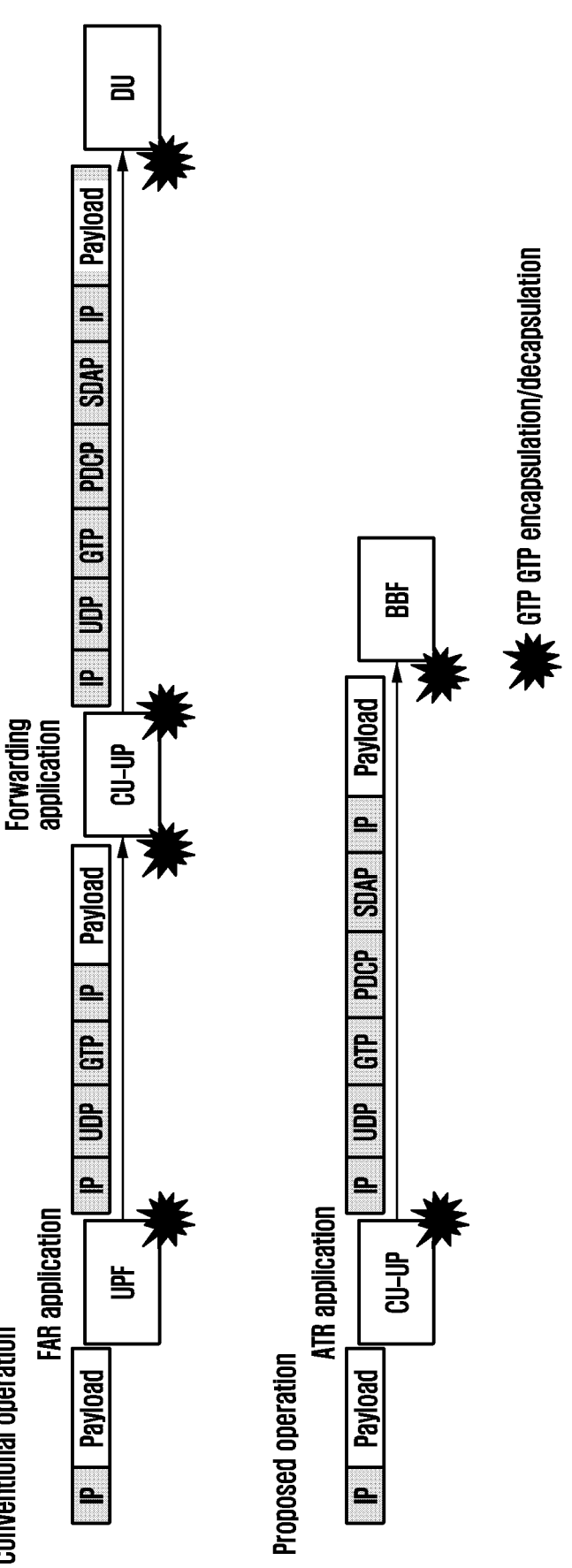
FIG. 9B illustrates a structure of a downlink packet on a user plane according to embodiments of the disclosure.

FIG. 9B illustrates a structure of a downlink packet on a user plane according to embodiments of the disclosure.

Referring to a conventional operation of FIG. 9B, a UPF inserts, in a general packet radio service tunneling protocol (RTP) header, a centralized unit-user plane (CU-UP) tunnel ID for a packet data unit (PDU) session including a quality-of-service (QOS) flow, inserts an IP address in an outer IP header, and then forwards a packet to the CU-UP. The CU-UP having received the packet inserts a distributed unit (DU) tunnel ID for a PDU session in the GTP header, inserts an IP address in the outer IP header, then forwards the packet to a DU.

On the contrary, referring to a proposed operation of FIG. 9B, it is enough for a C-UP to insert a tunnel ID of a BBF for a corresponding PDU session in a GTP header of a received IP packet, insert an IP address in an outer IP header, and then forward the packet. That is, according to embodiments of the disclosure, the number of network functions of a user plane decreases, and thus interface-related processing for a packet, such as GTP tunneling and a UDP, may be reduced.

Figure 10:
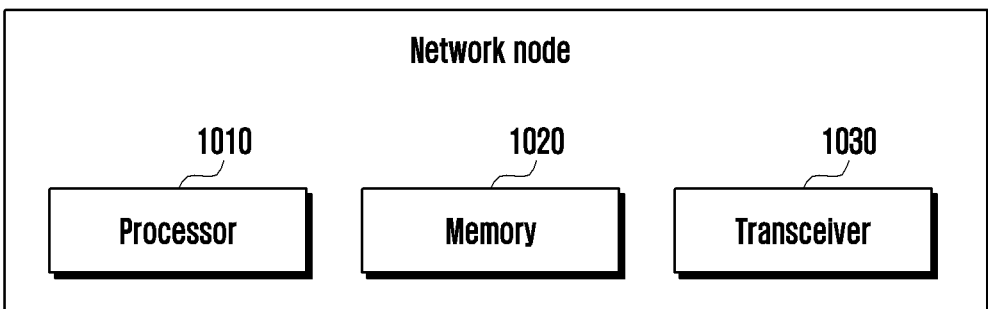
FIG. 10 illustrates a configuration of a network node according to embodiments of the disclosure.

FIG. 10 illustrates a configuration of a network node according to embodiments of the disclosure. Referring to FIG. 10, a network node may include a processor 1010, a memory 1020, and a transceiver 1030. According to an embodiment, the network node may be called a converged-user plane (C-UP). According to an embodiment, the network node may be a C-UP of a first type into which a function of a user plane function (UPF) and a function of a higher layer (e.g., at least one of a service data adaptation protocol (SDAP) or a packet data convergence protocol (PDCP)) of an access network (AN) are integrated. According to an embodiment, the network node may be a C-UP of a second type into which a function of the UPF and a function (e.g., at least one of an SDAP, a PDCP, a radio link control (RLC), a medium access control (MAC), or a physical (PHY)) of the access network are integrated.

The processor 1010 may control overall operations of the network node. For example, the processor 1010 may transmit and receive a signal via the transceiver 1030. In addition, the processor 1010 may record and read data in and from the memory 1020. In addition, the processor 1010 may perform functions of a protocol stack required in a communication specification. To this end, the processor 1010 may include at least one processor. In addition, the processor 1010 may control the network node to perform operations according to the aforementioned embodiments.

The memory 1020 may store data such as a basic program, an application program, and configuration information for an operation of the network node. The memory 1020 may be configured as a volatile memory, a nonvolatile memory, or a combination of a volatile memory and a nonvolatile memory. In addition, the memory 1020 may provide stored data according to a request of the processor 1010.

The transceiver 1030 may perform functions for transmitting or receiving a signal through a wired channel or a wireless channel. For example, the transceiver 1030 may perform a function of conversion between a baseband signal and a bitstream according to a physical layer specification of a system. For example, in case that data is transmitted, the transceiver 1030 may generate complex symbols by encoding and modulating a transmission bitstream. Furthermore, in case that data is received, the transceiver 1030 reconstructs a baseband signal into a reception bit stream by demodulating and decoding same. In addition, the transceiver 1030 may up-convert a baseband signal into a radio-frequency (RF) band signal and then transmit the converted RF band signal through an antenna, and down-convert an RF band signal received through an antenna into a baseband signal. To this end, the transceiver 1030 may include a transmission filter, a reception filter, an amplifier, a mixer, an oscillator, a digital-to-analog converter (DAC), an analog-to-digital converter (ADC), and the like. Furthermore, the transceiver 1030 may include an antenna part. The transceiver 1030 may include at least one antenna array configured by multiple antenna elements. In view of hardware, the transceiver 1030 may be configured by digital and analog circuits (e.g., radio frequency integrated circuit (RFIC)). The digital and analog circuits may be implemented as a single package. In addition, the transceiver 1030 may include multiple RF chains. Furthermore, the transceiver 1030 may transmit or receive a signal. In addition, the transceiver 1030 may receive a packet processing rule (e.g., at least one of a packet detection rule (PDR), a forwarding action rule (FAR), a quality-of-service enforcement rule (QER), a usage reporting rule (URR), or an access network treatment rule (ATR)) via an interface (e.g., N4 interface) with a control plane network function (NF). To this end, the transceiver 1130 may include at least one transceiver.

Figure 11:
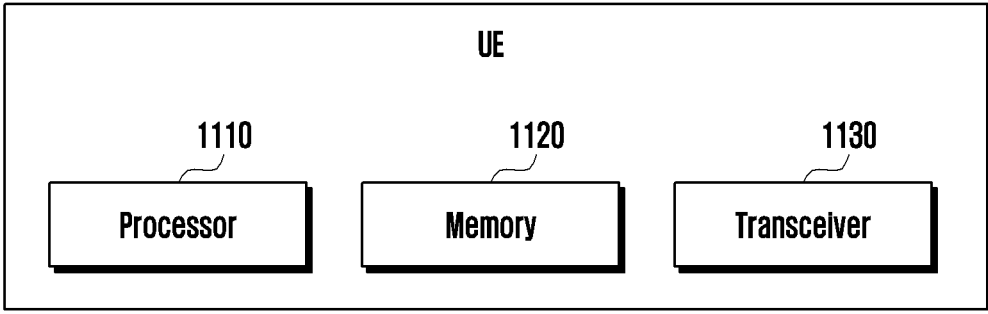
FIG. 11 illustrates a configuration of a terminal according to embodiments of the disclosure.

FIG. 11 illustrates a configuration of a terminal according to embodiments of the disclosure. Referring to FIG. 11, a terminal may include a processor 1110, a memory 1120, and a transceiver 1130.

The processor 1110 may control overall operations of the terminal. For example, the processor 1110 may transmit and receive a signal via the transceiver 1130. In addition, the processor 1110 may perform functions of a protocol stack required in a communication specification. To this end, the processor 1110 may include at least one processor. In addition, the processor 1110 may control the terminal to perform operations according to the aforementioned embodiments.

The memory 1120 may store data such as a basic program, an application program, and configuration information for an operation of the terminal. The memory 1120 may be configured as a volatile memory, a nonvolatile memory, or a combination of a volatile memory and a nonvolatile memory. The memory 1120 may provide stored data according to a request of the processor 1110.

The transceiver 1130 may perform functions for transmitting or receiving a signal through a wired channel or a wireless channel. For example, the transceiver 1130 may perform a function of conversion between a baseband signal and a bitstream according to a physical layer specification of a system. For example, in case that data is transmitted, the transceiver 1130 may generate complex symbols by encoding and modulating a transmission bitstream. Furthermore, in case that data is received, the transceiver 1130 reconstructs a baseband signal into a reception bit stream by demodulating and decoding same. In addition, the transceiver 1130 may up-convert a baseband signal into a radio-frequency (RF) band signal and then transmit the converted RF band signal through an antenna, and down-convert an RF band signal received through an antenna into a baseband signal. To this end, the transceiver 1130 may include a transmission filter, a reception filter, an amplifier, a mixer, an oscillator, a digital-to-analog converter (DAC), an analog-to-digital converter (ADC), and the like. Furthermore, the transceiver 1130 may include an antenna part. The transceiver 1130 may include at least one antenna array configured by multiple antenna elements. In view of hardware, the transceiver 1130 may be configured by digital and analog circuits (e.g., radio frequency integrated circuit (RFIC)). The digital and analog circuits may be implemented as a single package. In addition, the transceiver 1130 may include multiple RF chains. Furthermore, the transceiver 1130 may transmit or receive a signal. To this end, the transceiver 1130 may include at least one transceiver.

In addition, the disclosure provides a device and a method for processing a packet via a single user plane entity.

In addition, the disclosure provides a device and a method for identifying a quality-of-service (QOS) requirement for an internet protocol (IP) flow, based on current QoS status information of the IP flow outside a service provider network.

In addition, the disclosure provides a device and a method for identifying a data radio bearer (DRB) for an IP flow, based on an IP flow-specific QoS requirement.

In addition, the disclosure provides a device and a method for allocating a resource for an IP flow, based on an IP flow-specific QoS requirement.

In addition, the disclosure provides a device and a method for performing QoS enforcement in a unit of an IP flow.

In addition, the disclosure provides a device and a method for reducing signaling overhead with a control plane network function.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

The methods according to various embodiments described in the claims or the specification of the disclosure may be implemented by hardware, software, or a combination of hardware and software.

In case that the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

What is claimed is:

1. A method performed by a user plane network node in a communication system, the method comprising:

obtaining information on a packet processing rule from a control plane network function;

receiving an internet protocol (IP) packet via a data network, the IP packet including outside quality-of-service (QoS) information for the IP packet, the outside QoS information indicating a QoS between the user plane network node and a source node of an IP flow corresponding to the IP packet;

identifying the outside QoS information in the IP packet based on extraction information included in the information on the packet processing rule;

generating a QoS requirement for the IP flow corresponding to the IP packet, based on the packet processing rule and the outside QoS information; and allocating a resource for the IP flow, based on the QoS requirement.

2. The method of claim 1, wherein the extraction information comprises information required to obtain the outside QoS information from the IP packet.

3. The method of claim 1, wherein the allocating of the resource for the IP flow comprises:

identifying a data radio bearer (DRB) corresponding to the IP flow, based on the QoS requirement; and transmitting the IP packet to a baseband function (BBF) through the identified DRB, and wherein the IP packet comprises information indicating whether the DRB corresponding to the IP flow has been changed.

4. The method of claim 1, wherein the information on the packet processing rule comprises QoS characteristic information for the IP flow, and wherein the QoS requirement is generated based on the QoS characteristic information and the outside QoS information.

5. The method of claim 4, wherein the QoS characteristic information indicates a resource type, a packet delay budget, a packet error rate, a target data rate, or a QoS characteristic index, which is required for the IP flow.

6. The method of claim 1, wherein the outside QoS information comprises at least one of a hop count or time-stamp included in a header of the IP packet.

7. The method of claim 1, wherein the QoS requirement indicates a resource allocation priority in a radio interval, and a delay, a bit rate, and an error rate required for the IP flow in the radio interval.

8. The method of claim 1, wherein the resource is allocated based on the QoS requirement and QoS information for the IP flow in a radio interval, and wherein the QoS information in the radio interval comprises at least one of a queue status for the IP flow, resource allocation information of a medium access control (MAC) layer, or a packet error rate.

9. The method of claim 1, comprising:

identifying whether the IP packet is included in the IP flow; and in case that the IP packet is included in the IP flow, allocating a resource for the IP packet, based on the QoS requirement.

10. The method of claim 9, wherein the packet processing rule comprises packet detection information including an IP address of a terminal, a network instance, core network tunnel information, an application ID, a QoS flow ID, and Ethernet PDU session information, and wherein whether the IP packet is included in the IP flow is determined based on the packet detection information.

11. A user plane network node in a communication system, the user plane network node comprising:

at least one transceiver; and at least one processor coupled with the at least one transceiver and configured to:

obtain information on a packet processing rule from a control plane network function, receive an internet protocol (IP) packet via a data network, the IP packet including outside quality-of-service (QoS) information for the IP packet, the outside QoS information indicating a QoS between the user plane network node and a source node of an IP flow corresponding to the IP packet, identify the outside QoS information in the IP packet based on extraction information included in the information on the packet processing rule, generate a QoS requirement for the IP flow corresponding to the IP packet, based on the packet processing rule and the outside QoS information, and allocate a resource for the IP flow, based on the QoS requirement.

12. The user plane network node of claim 11, wherein the extraction information comprises information required to obtain the outside QoS information from the IP packet, wherein the outside QoS information comprises at least one of a hop count or timestamp included in a header of the IP packet, wherein the QoS requirement indicates a resource allocation priority in a radio interval, and a delay, a bit rate, and an error rate required for the IP flow in the radio interval, wherein the resource is allocated based on the QoS requirement and QoS information for the IP flow in a radio interval, and wherein the QoS information in the radio interval comprises at least one of a queue status for the IP flow, resource allocation information of a medium access control (MAC) layer, or a packet error rate.

13. The user plane network node of claim 11, wherein the at least one processor is configured to:

identify a data radio bearer (DRB) corresponding to the IP flow, based on the QoS requirement; and transmit the IP packet to a baseband function (BBF) through the identified DRB, and wherein the IP packet comprises information indicating whether the DRB corresponding to the IP flow has been changed.

14. The user plane network node of claim 11, wherein the information on the packet processing rule comprises QoS characteristic information for the IP flow, wherein the QoS requirement is generated based on the QoS characteristic information and the outside QoS information, and wherein the QoS characteristic information indicates a resource type, a packet delay budget, a packet error rate, a target data rate, or a QoS characteristic index, which is required for the IP flow.

15. The user plane network node of claim 11, wherein the at least one processor is configured to:

identify whether the IP packet is included in the IP flow; and in case that the IP packet is included in the IP flow, allocate a resource for the IP packet, based on the QoS requirement, wherein the packet processing rule comprises packet detection information including an IP address of a terminal, a network instance, core network tunnel information, an application ID, a QoS flow ID, and Ethernet PDU session information, and wherein whether the IP packet is included in the IP flow is determined based on the packet detection information.

* * * * *